United States Patent [19]

Sjolund

[11] 4,362,182

[45] Dec. 7, 1982

[54] NOZZLE FORCE FEEDBACK FOR PILOT STAGE FLAPPER

[75] Inventor: John R. Sjolund, Arden Hills, Minn.

[73] Assignee: Sundstrand Corporation, Rockford, Ill.

[21] Appl. No.: 225,081

[22] Filed: Jan. 14, 1981

[51] Int. Cl.³ ............................................. G05D 16/00
[52] U.S. Cl. ........................................ 137/85; 137/82; 137/625.64; 91/51
[58] Field of Search ............... 137/82, 85, 625.64, 137/625.62; 91/51

[56] References Cited

U.S. PATENT DOCUMENTS

| | | |
|---|---|---|
| 2,824,574 | 2/1958 | Place . |
| 2,939,430 | 6/1960 | Westbury . |
| 2,964,059 | 12/1960 | Geyer . |
| 2,972,338 | 2/1961 | Lloyd . |
| 2,976,848 | 3/1961 | Place . |
| 3,015,317 | 1/1962 | Buchanan et al. . |
| 3,023,782 | 3/1962 | Chaves . |
| 3,054,416 | 9/1962 | Lucien . |
| 3,174,499 | 3/1965 | Mott ........................ 137/82 |
| 3,260,273 | 7/1966 | Hayner . |
| 3,447,555 | 6/1969 | Jenney . |
| 3,698,437 | 10/1972 | Cox ..................... 137/625.62 |

*Primary Examiner*—Alan Cohan
*Attorney, Agent, or Firm*—Ted E. Killingsworth; Michael B. McMurry; James A. Wanner

[57] ABSTRACT

A pilot stage for use in pilot pressure control applications includes a magnetic torque motor having an output torque in response to an input current, a flapper operated by the magnetic torque motor and responsive to the output torque, the magnetic torque motor being arranged to apply a resultant spring rate to the flapper, and first and second nozzles responsive to the output torque applied to the flapper for providing a differential output pressure proportional to input current, the first and second nozzles having a size sufficiently large to swamp out the resultant spring rate applied to the flapper so that the first and second nozzles apply a feedback force to the flapper sufficient by itself to substantially balance motor torque.

12 Claims, 7 Drawing Figures

U.S. Patent    Dec. 7, 1982    4,362,182
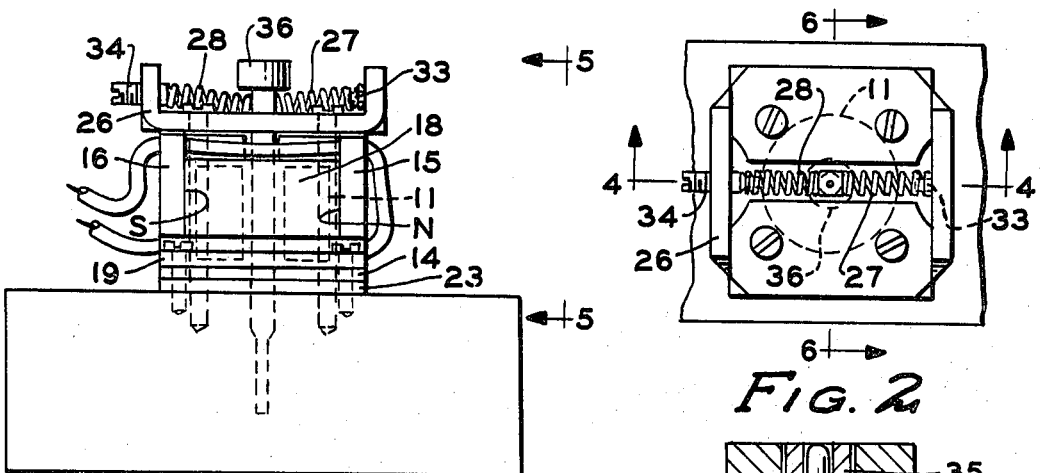
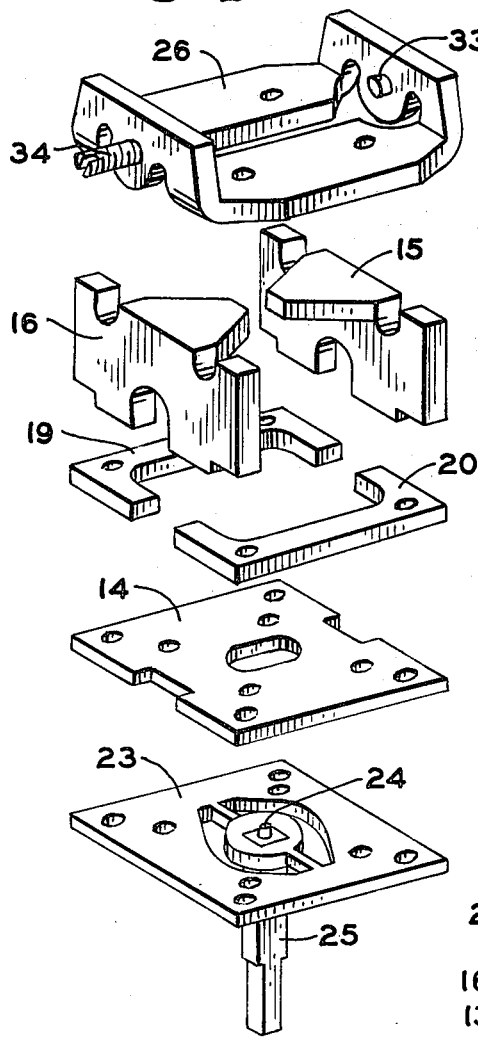
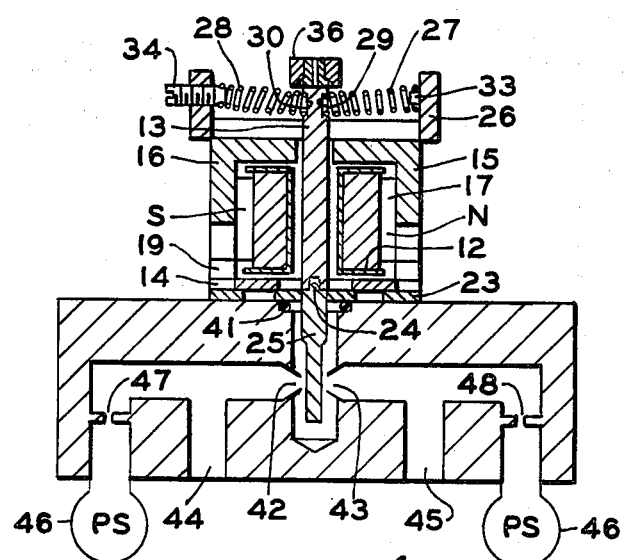
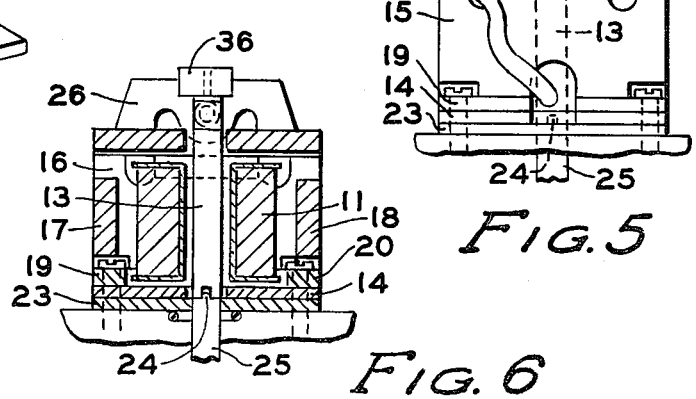

NOZZLE FORCE FEEDBACK FOR PILOT STAGE FLAPPER

BACKGROUND OF THE INVENTION

The present invention relates to nozzle-flapper pilot valves used in pilot pressure control applications such as in the pilot stages of pressure controlled servovalves and, more particularly, to an arrangement wherein the nozzles responsive to flapper position are of sufficient size such that the pressure within the nozzles provides a feedback torque on the flapper of the pilot valve to substantially balance the torque applied to the flapper by the torque motor of the pilot valve.

A servovalve is one application for the present invention and, therefore, the present invention will be described in connection with servovalves. Servovalves are typically two-stage devices which respond to an input electrical signal for providing a differential pressure output utilized by a hydraulic motor for performing work. For example, such a servovalve is comprised of a pilot stage and a boost stage. The pilot stage is typically a valve having a magnetic motor which responds to an input electrical signal for positioning a flapper between a pair of nozzles. The position of the flapper between the nozzles controls the pressure within the nozzles in order to provide a controllable differential output pressure from the pilot stage.

The boost valve stage is an amplifying stage which has a spool the position of which is controlled by the differential output pressure from the pilot stage. The spool is used to control the output differential pressure from the boost valve stage. The boost valve stage differential output pressure is then used for positioning a hydraulic motor.

The magnetic motor of the pilot stage section exerts on the flapper both a magnetic spring rate as a result of the magnetic structure used in the motor and also a mechanical spring rate as a result of the centering springs used to center the flapper when the motor is deenergized. Prior art pilot stages thus had a substantial spring rate acting upon the flapper such that a significant percentage of the torque developed by the magnetic motor of the pilot stage was used in counteracting the spring rate leaving the remaining torque for positioning the flapper between the nozzles of the pilot stage. The position of the flapper in such a valve is proportional to the current input to the magnetic motor such that the differential pressure versus input current response of the pilot stage changes as the supply pressure changes.

A valve in which the differential output pressure is truly proportional to the input current such that changes in supply pressure have no appreciable affect upon the pressure versus current response of the valve is more desirable. This result can be obtained by reducing the resultant spring rate between the magnetic and mechanical spring rates applied to the flapper and increasing the pilot nozzle size so that the force applied by the nozzle pressure to the flapper is substantially greater than the resultant spring rate acting on the flapper. The feedback torque acting on the flapper from the differential nozzle pressure is sufficient, therefore, to balance the torque produced by the magnetic motor. Thus, if supply pressure changes, the flapper assumes a position to maintain a substantially constant differential output pressure across the output of the pilot stage.

SUMMARY OF THE INVENTION

These results can be obtained by providing a pilot stage having a magnetic torque motor for producing an output torque in response to an input current, a flapper positionable in response to the output torque, the magnetic torque motor being arranged to apply a resultant spring rate to the flapper, and a nozzle arrangement responsive to the position of the flapper for providing an output pressure proportional to the input current, the nozzle arrangement having a nozzle of a sufficient size to swamp out the resultant spring rate applied to the flapper so that the nozzle applies a feedback torque to the flapper sufficient by itself to substantially balance motor torque.

BRIEF DESCRIPTION OF THE DRAWINGS

These and other features and advantages will become more apparent from a detailed consideration of the invention when taken in conjunction with the drawings in which:

FIG. 1 shows a side view of the pilot stage according to the present invention;

FIG. 2 shows a top view;

FIG. 3 shows a partial exploded view of the pilot stage;

FIG. 4 is a cross-sectional view of the pilot stage;

FIG. 5 is a front view of the magnetic torque motor forming a part of the pilot stage;

FIG. 6 is a cross-section of the motor shown in FIG. 5; and,

FIG. 7 is a cross-sectional view of damper 36.

DETAILED DESCRIPTION

The pilot stage shown in the drawing comprises coil 11 wound around bobbin 12 through which armature 13 extends. Bobbin 12 is supported between plate 14 and pole pieces 15 and 16. Permanent magnet 17 extends from pole piece 15 to pole piece 16 on one side of armature 13 and permanent magnet 18 extends from pole piece 15 to pole piece 16 on the other side of armature 13. Pole pieces 15 and 16 are separated from plate 14 by spacers 19 and 20. Pivot plate 23 supports this assembly and has a torsion bar pivot 24 included therewith for providing a pivot point for armature 13 and flapper 25. Armature 13 and flapper 25 may be suitably attached to torsion bar pivot 24 as by a unitized construction or by brazing or the like. Armature 13 and flapper 25 together form the flapper of the pilot stage valve.

To complete the magnetic motor portion of the pilot stage valve, spring holder plate 26 is suitably attached to pole pieces 15 and 16 and supports null adjustment springs 27 and 28 which are connected between the end flanges of plate 26 and armature 13. Armature 13 has suitable recesses 29 and 30 therein for receiving the ends of springs 27 and 28. One end of spring holding plate 26 has a short stub 33 for receiving the other end of spring 27 and adjustment screw 34 receives the other end of spring 28. Armature 13 has a roll pin 35 extending through its top for cooperation with damper mechanism 36. Damper mechanism 36 is designed to move with armature 13 but to damp out any noise which might be caused by vibration of armature 13.

The magnetic motor arrangement is sealed by O-ring seal 41 from the nozzle arrangement. Flapper 25 extends down between nozzles 42 and 43 for controlling the pressures therein. Output port 44 provides the pressure within nozzle 42 as an output pressure and output port 45 provides the pressure within nozzle 43 as an output pressure. Pressure is supplied to nozzles 42 and 43 from pressure supply 46 through power orifices 47 and 48. Output ports 44 and 45 together provide the output differential pressure from the pilot stage.

In setting up the pilot stage for operation, the magnets of the pilot stage magnetic torque motor are first charged to saturation and then demagnetized until the magnetic spring rate is just less than the mechanical spring rate produced by springs 27 and 28 and torsion bar plates 23, 24 so that there is a slight mechanical spring rate on the armature 13 to keep it centered when source 46 is not connected to the valve. (If there is zero resultant spring rate on armature 13, then armature 13 floats and may, for example, be in an extreme position because of external forces and/or because the flapper was in the extreme position when the pilot stage has been previously deenergized. In such an extreme position, with no current input into the magnetic torque motor, the application of supply pressure at source 46 will result in a sudden large differential output pressure at output ports 44 and 45 which will result in sudden hammering of the boost valve and load. This sudden large differential output pressure, however, will decay as the forces acting on the flapper 25 from nozzles 42 and 43 increases due to building source pressure. These forces will eventually center flapper 25 between the nozzles.) Momentary surges in the differential output pressure when supply pressure is first applied to the pilot stage can be eliminated by applying a slight resultant spring rate to the flapper so that the flapper is in a center position producing no differential output pressure (with little or no supply pressure applied to the valve) until a current input is supplied to the magnetic torque motor.

The size of nozzles 42 and 43 are then chosen so that the torque applied on flapper 25 by the fluid exiting nozzles 42 and 43 from supply 46 is much larger and swamps out or is substantially greater than the resultant spring rate on armature 13. The nozzle size of nozzles 42 and 43 must also be selected so that the torque exerted on flapper 25 by the fluid exiting nozzles 42 and 43 is capable of balancing the maximum torque exerted on armature 13 by the magnetic torque motor, this maximum torque being any desired maximum torque depending upon the desired performance of the pilot control valve. That is, the size of nozzles 42 and 43 is chosen so that the pressure across output ports 44 and 45 applies a feedback torque to flapper 25 so that this torque balances the torque on armature 13 as applied by the magnetic torque motor. Thus, as the torque applied to armature 13 changes, the position of flapper 25 will change to a point where the torque applied to it due to the force exerted on it by the fluid exiting nozzles 42 and 43 which is a function of the differential pressure across output lines 44 and 45 balances the torque applied to armature 13 by the magnetic torque motor. The size of nozzles 42 and 43 may be conveniently determined by using the expression $$T_{max} = (A_N)(L_F)(\Delta P)$$

where $T_{max}$ is the maximum torque desired to be generated by the magnetic torque motor, $A_N$ is the area of the nozzles, $L_F$ is the length of the flapper from the nozzles to its pivot point, and $\Delta P$ is the differential output pressure across output ports 44 and 45. Because of this feedback, the differential pressure across output ports 44 and 45 is proportional to the input current supplied to coil 11 which generates the torque on armature 13.

Inherent in this design is the ability of the device to compensate for variations in load applied to output ports 44 and 45. If the load on either or both ports changes (for instance the flow rate), the flapper will move to maintain substantially the same output differential pressure.

The embodiments of the invention in which an exclusive property or right is claimed are defined as follows:

1. A pilot stage comprising:
   magnetic torque motor means having an output torque in response to an input current;
   a flapper operated by said magnetic torque motor means and responsive to said output torque, said magnetic torque motor means comprising permanent magnet means contributing to a magnetic spring rate applied to said flapper and centering spring means for centering said flapper when little or no fluid supply pressure is applied to said pilot stage, said centering spring means contributing to a mechanical spring rate applied to said flapper, said permanent magnet means being magnetized at a point where the resultant spring rate between said magnetic spring rate and said mechanical spring rate is small but enough to center said flapper under little or no supply pressure conditions, and,
   nozzle means responsive to the output torque applied to said flapper for providing an output pressure proportional to the input current, said nozzle means including at least one nozzle having a size sufficiently large to swamp out the resultant spring rate applied to said flapper so that said nozzle means applies a feedback torque to said flapper sufficient by itself to substantially balance motor torque.

2. The pilot stage of claim 1 wherein said flapper comprises an armature part surrounded by said coil and a flapper part operating in conjunction with said nozzle means for controlling said outer pressure.

3. The pilot stage of claim 2 wherein said nozzle size is selected by using the following equation:

$$T_{max} = (A_N)(L_F)(\Delta P)$$

where $T_{max}$ is the maximum torque desired to be generated by the magnetic torque motor means, $A_N$ is the area of said nozzle means, $L_F$ is the length of said flapper part from said nozzle means to a pivot point about which said flapper moves, and $\Delta P$ is the output pressure.

4. The pilot stage of claim 1 wherein said flapper comprises an armature part upon which said magnetic torque motor means acts and a flapper part operating in conjunction with said nozzle means for controlling said output pressure.

5. The pilot stage of claim 4 wherein said nozzle size is selected by using the following equation:

$$T_{max} = (A_N)(L_F)(\Delta P)$$

where $T_{max}$ is the maximum torque desired to be generated by the magnetic torque motor means, $A_N$ is the area of said nozzle means, $L_F$ is the length of said flapper part from said nozzle means to a pivot point about which said flapper moves, and $\Delta P$ is the output pressure.

6. The pilot stage of claim 1 wherein said nozzle size is selected by using the following equation:

$$T_{max} = (A_N)(L_F)(\Delta P)$$

where $T_{max}$ is the maximum torque desired to be generated by the magnetic torque motor means, $A_N$ is the area of said nozzle means, $L_F$ is the length of said flapper from said nozzle means to the pivot point about which said flapper moves, and $\Delta P$ is the output pressure.

7. A pilot stage comprising:
magnetic torque motor means having an output torque in response to an input current;
a flapper operated by said magnetic torque motor means and responsive to said output torque, said magnetic torque motor means comprising permanent magnet means contributing to a magnetic spring rate applied to said flapper and centering spring means for centering said flapper when little or no fluid supply pressure is applied to said pilot stage, said centering spring means contributing to a mechanical spring rate applied to said flapper, said permanent magnet means being magnetized at a point where the resultant spring rate between said magnetic spring rate and said mechanical spring rate is small but enough to center said flapper under little or no supply pressure conditions, and,
first and second nozzles responsive to the output torque supplied to said flapper for providing a differential output pressure proportional to the input current, said first and second nozzles having a size sufficiently large to swamp out the resultant spring rate applied to said flapper so that said first and second nozzles apply a feedback torque to said flapper sufficient by itself to substantially balance motor torque.

8. The pilot stage of claim 7 wherein said flapper comprises an armature part surrounded by said coil and a flapper part operating in conjunction with said first and second nozzles for controlling said differential output pressure.

9. The pilot stage of claim 8 wherein said nozzle size of said first and second nozzles is selected by using the following equation:

$$T_{max} = (A_N)(L_F)(\Delta P)$$

where $T_{max}$ is the maximum torque desired to be generated by the magnetic torque motor means, $A_N$ is the area of said first and second nozzles, $L_F$ is the length of said flapper part from said first and second nozzles to a pivot point about which said flapper moves, and $\Delta P$ is the differential output pressure.

10. The pilot stage of claim 7 wherein said flapper comprises an armature part upon which said magnetic torque motor means acts and a flapper part operating in conjunction with said first and second nozzles for controlling said differential output pressure.

11. The pilot stage of claim 10 wherein said nozzle size of said first and second nozzles is selected by using the following equation:

$$T_{max} = (A_N)(L_F)(\Delta P)$$

where $T_{max}$ is the maximum torque desired to be generated by the magnetic torque motor means, $A_N$ is the area of said first and second nozzles, $L_F$ is the length of said flapper part from said first and second nozzles to a pivot point about which said flapper moves, and $\Delta P$ is the differential output pressure.

12. The pilot stage of claim 7 wherein said nozzle size of said first and second nozzles is selected by using the following equation:

$$T_{max} = (A_N)(L_F)(\Delta P)$$

where $T_{max}$ is the maximum torque desired to be generated by the magnetic torque motor means, $A_N$ is the area of said first and second nozzles, $L_F$ is the length of said flapper from said first and second nozzles to a pivot point about which said flapper moves, and $\Delta P$ is the differential output pressure.

* * * * *

Disclaimer 4,362,182.—*John R. Sjolund,* Arden Hills, Minn. NOZZLE FORCE FEEDBACK FOR PILOT STAGE FLAPPER. Patent dated Dec. 7, 1982. Disclaimer filed Dec. 20, 1984, by the assignee, *Sundstrand Corp.*

Hereby enters this disclaimer to all claims of said patent.
[*Official Gazette July 23, 1985.*]